United States Patent
Sammito et al.

(10) Patent No.: US 11,807,375 B2
(45) Date of Patent: Nov. 7, 2023

(54) AIRCRAFT NACELLE COMPRISING A SEAL SYSTEM WITH A SPRING FOR A CAP OF SAID NACELLE

(71) Applicant: Airbus Operations SAS, Toulouse (FR)

(72) Inventors: Laurent Sammito, Toulouse (FR); Jean Geliot, Toulouse (FR); Thierry Theron, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/709,514

(22) Filed: Mar. 31, 2022

(65) Prior Publication Data

US 2022/0315233 A1    Oct. 6, 2022

(30) Foreign Application Priority Data

Apr. 2, 2021 (FR) .................................. 2103426

(51) Int. Cl.
*B64D 29/02* (2006.01)
(52) U.S. Cl.
CPC .................................. *B64D 29/02* (2013.01)
(58) Field of Classification Search
CPC ...................................................... B64D 29/02
See application file for complete search history.

(56) References Cited

U.S. PATENT DOCUMENTS

| | | | | |
|---|---|---|---|---|
| 5,603,471 | A * | 2/1997 | Armstrong | F02K 1/80 244/110 B |
| 10,138,742 | B2 * | 11/2018 | Budnick | F01D 9/041 |
| 2011/0114796 | A1 | 5/2011 | Porte et al. | |
| 2011/0116916 | A1 * | 5/2011 | Porte | B64D 29/06 415/201 |
| 2021/0190000 | A1 * | 6/2021 | Torjesen | F02K 1/10 |
| 2022/0106911 | A1 * | 4/2022 | Jacon | F02C 7/28 |

FOREIGN PATENT DOCUMENTS

| | | |
|---|---|---|
| FR | 3087751 A1 | 5/2020 |
| WO | 2010007311 A1 | 1/2010 |
| WO | 2010007313 A1 | 1/2010 |

OTHER PUBLICATIONS

French Search Report; priority document.

* cited by examiner

*Primary Examiner* — Christopher D Hutchens
*Assistant Examiner* — Steven J Shur
(74) *Attorney, Agent, or Firm* — Greer, Burns & Crain, Ltd.

(57) ABSTRACT

A nacelle for an aircraft, including a structure, a cap attached to the structure and a seal system including an arch forming a channel which extends beneath a rear edge of the cap and which has a bottom, the arch being attached to the structure, a seal in the form of a solid block in the channel and beneath the rear edge of the cap, a spring system arranged to move the seal away from the bottom, and a retaining arrangement configured to prevent the seal from leaving the channel under the action of the spring system. With an arrangement of this kind, it is not necessary to oversize the bead, this being replaced with a solid seal mounted on a spring system.

11 Claims, 5 Drawing Sheets

Fig. 5
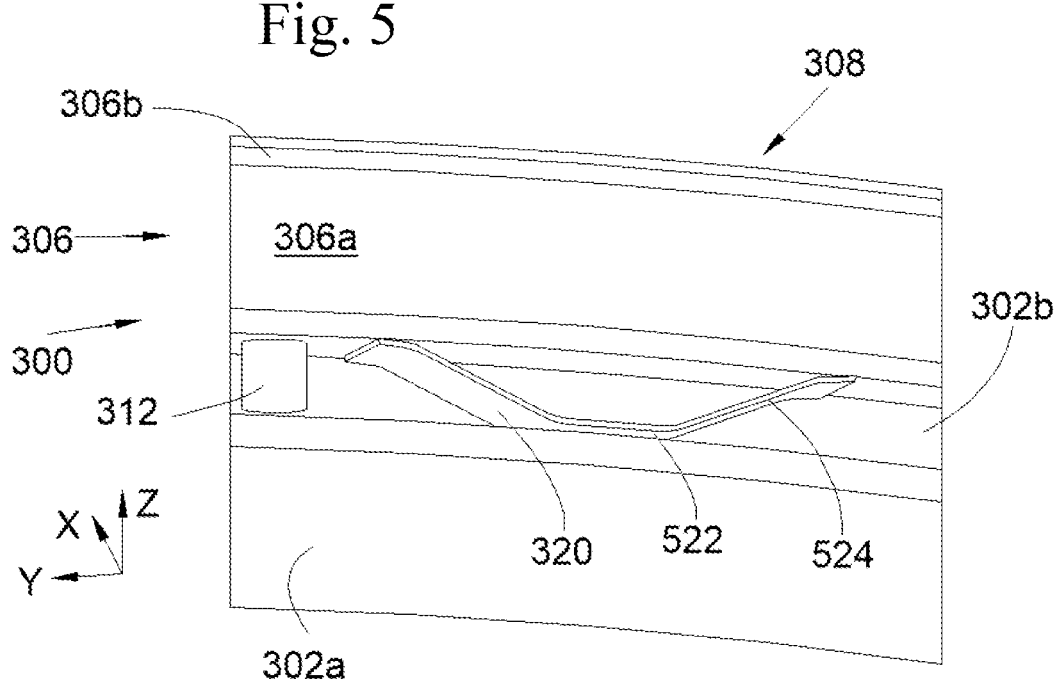
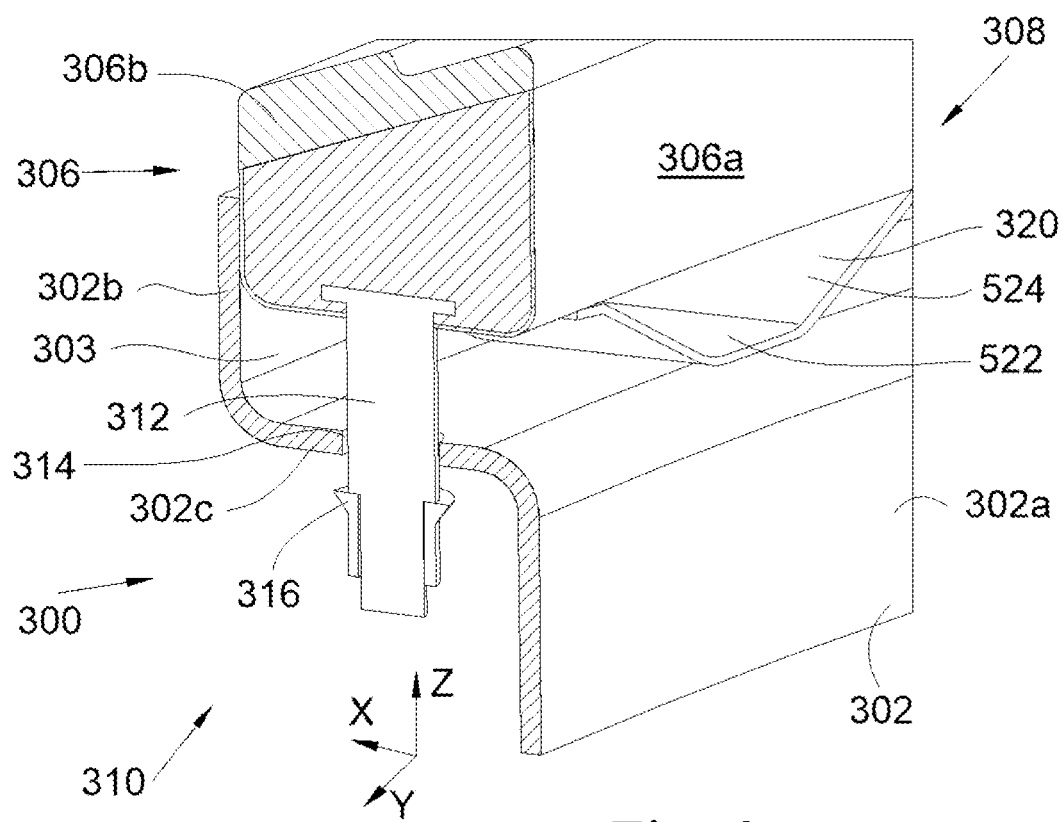
Fig. 6

AIRCRAFT NACELLE COMPRISING A SEAL SYSTEM WITH A SPRING FOR A CAP OF SAID NACELLE

CROSS-REFERENCES TO RELATED APPLICATIONS

This application claims the benefit of the French patent application No. 2103426 filed on Apr. 2, 2021, the entire disclosures of which are incorporated herein by way of reference.

FIELD OF THE INVENTION

The present invention relates to an aircraft nacelle comprising a cap and a seal system comprising a spring system, and to an aircraft comprising a nacelle of this kind.

BACKGROUND OF THE INVENTION

An aircraft conventionally comprises a fuselage, to either side of which a wing is attached. Each wing supports at least one mounting pylon which in turn supports a nacelle and an engine forming a turbomachine. The nacelle forms the aerodynamic surface which surrounds the engine. The mounting pylon is attached between the wing structure and the nacelle.

FIG. 2 shows a perspective view of a propulsion system 200 comprising an engine 202, represented here by its nozzle, and a nacelle 204. The nacelle 204 has an air intake 206 and it is attached to the wing by the pylon 208.

The nacelle 204 comprises a structure which is attached to the pylon 208 and which bears a plurality of cowlings, among which is an air intake cowling 210 which surrounds the air intake 206, lateral cowlings 212, in particular fan cowlings and thrust reversal cowlings, which are on either side of the nacelle 204, and an upper cowling 214 that provides the fairing around the junction between the pylon 208 and the structure of the nacelle 204.

The nacelle 204 also comprises a cap 220 which is a cowling having an aerodynamic role and which provides the aerodynamic connection between the air intake cowling 210, the lateral cowlings 212 and the upper cowling 214.

This cap 220 is generally movable in order to ensure aerodynamic continuity with the air intake 206 and the cowlings.

FIG. 7 shows a view in section along a vertical plane of the nacelle 204 at the level of the junction between the upper cowling 214 and the cap 220. The nacelle 204 comprises a seal system 700 which is arranged at the level of the junction between the upper cowling 214 and the cap 220.

The seal system 700 has two main purposes.

The seal system 700 acts as a bulkhead, in particular a firestop.

The seal system 700 also acts to provide dimension compensation, accommodating manufacturing tolerances and variations in the position of the cap 220.

The seal system 700 comprises a base 702 attached to the structure 50 of the nacelle 204 and a bead 706 that is secured to the base 702. The base 702 and the bead 706 are a single element which is made of a relatively flexible material of the elastomer type.

The bead 706 is pressed beneath the cap 220 and the seal system 700 is arranged so as to block the passage between the rear edge of the cap 220, the upper cowling 214 and the structure 50.

In order to avoid excessive crushing of the bead 706, under the action of the cap 220, the seal system 700 also comprises a reinforcement 708 which is attached to the base 702 and has a fold 710 which comes in behind the bead 706 relative to the cap 220. Thus, the bead 706 is positioned between the fold 710 and cap 220.

Although such an arrangement is entirely satisfactory, increasing the size of the nacelles 204 means that the cross section of the bead 706 has to be increased in order for the latter to be able to work without excessive crushing.

This makes it necessary to find an arrangement that does not require a bead having a large cross section.

SUMMARY OF THE INVENTION

One aim of the present invention is to propose an aircraft nacelle comprising a cap and a seal system which ensures leaktightness between the upper cowling and the cap, and which provides dimensional compensation.

To that end, the present document proposes an aircraft nacelle comprising a structure, a cap attached to the structure and a seal system comprising:

an arch forming a channel which extends beneath a rear edge of the cap and which has a bottom, the arch being attached to the structure, a seal in the form of a solid block accommodated in the channel and positioned beneath the rear edge of the cap, a spring system arranged to move the seal away from the bottom, and retaining means arranged to prevent the seal from leaving the channel under the action of the spring system.

With an arrangement of this kind, it is not necessary to oversize the bead, this being replaced with a solid seal mounted on a spring system.

Advantageously, the retaining means comprise a plurality of inserts, each one having a first end that is secured to the seal and a second end that passes through the bottom of the channel through a hole through the bottom and provided therefor, and a shoulder which is secured to the second end of the insert and whose dimensions prevent it from passing through the hole in the bottom.

Advantageously, a central insert is arranged at the level of a middle plane, and the hole corresponding to the central insert is a circular bore that provides a sliding fit between the insert and the hole.

Advantageously, the spring system comprises a plurality of spring blades, each spring blade is arranged between the seal and the bottom of the channel, and each spring blade comprises a central portion attached to the bottom of the channel and two wings that are positioned on either side of the central portion and are oriented towards the seal.

Advantageously, the seal comprises a core which is oriented towards the bottom of the channel, and a strip which is secured to the core and is designed to press against the cap.

Advantageously, the strip has a Shore 00 hardness of between 30 and 40, and the core has a Shore 00 hardness of between 80 and 90.

Advantageously, the walls of the core that are in contact with the walls of the channel and the spring system are covered with a fabric.

According to one particular embodiment, the arch has a staircase-like cross section, of which: a first riser is attached to the structure; a second riser extends parallel to the structure and at a distance therefrom so as to delimit between them the thickness of the channel; and the step extends between the two risers and forms the bottom of the channel.

According to one particular embodiment, the arch has a U-shaped cross section that forms the channel and is attached by one of its flanks to the structure.

The invention also proposes an aircraft comprising a mounting pylon and a nacelle according to one of the preceding variants, mounted on the mounting pylon.

BRIEF DESCRIPTION OF THE DRAWINGS

The abovementioned features of the invention, and others, will appear more clearly upon reading the following description of an exemplary embodiment, the description being provided in relation to the appended drawings, among which:

FIG. 5 is a rear view of a detail of the seal system according to the invention, FIG. 6 is a section view of the seal system according to the invention.

DETAILED DESCRIPTION OF THE PREFERRED EMBODIMENTS

Figure 1:
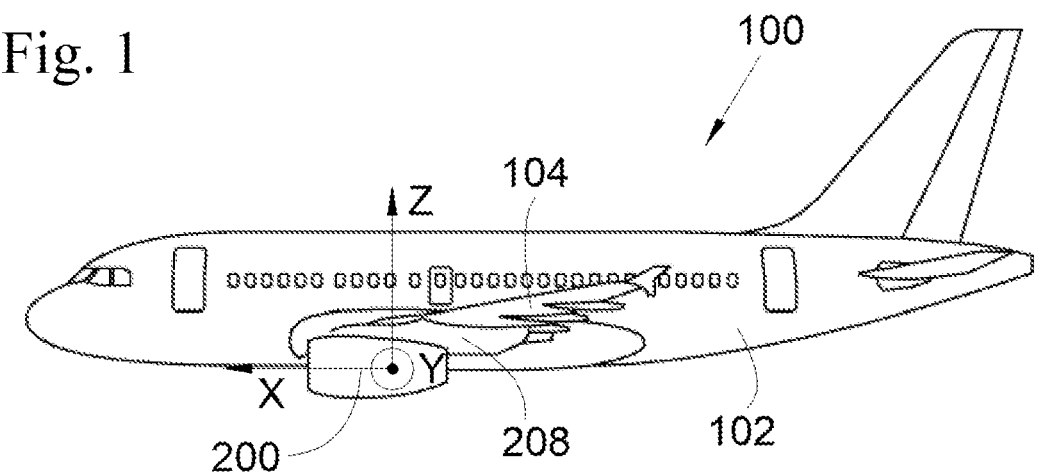
FIG. 1 is a side view of an aircraft according to the invention.

In the following description, the terms relating to a position are taken to refer to a nacelle mounted on an aircraft in forward motion, that is to say, as depicted in FIG. 1.

FIG. 1 shows an aircraft 100 which comprises a fuselage 102 on either side of which a wing 104 is attached. Beneath each wing 104 there is attached a mounting pylon 208 on which there is mounted a propulsion system 200 which comprises a nacelle and an engine surrounded by the nacelle.

In the following description, and as is conventional, X is the longitudinal axis of the nacelle which has positive orientation in the direction of advance of the aircraft 100 and which is also parallel to the longitudinal axis of the aircraft 100; Y is the transverse axis of the nacelle which is horizontal when the aircraft 100 is on the ground; and Z is the vertical axis or vertical height when the aircraft 100 is on the ground, these three directions X, Y and Z being mutually orthogonal and forming an orthonormal reference system.

Figure 2:
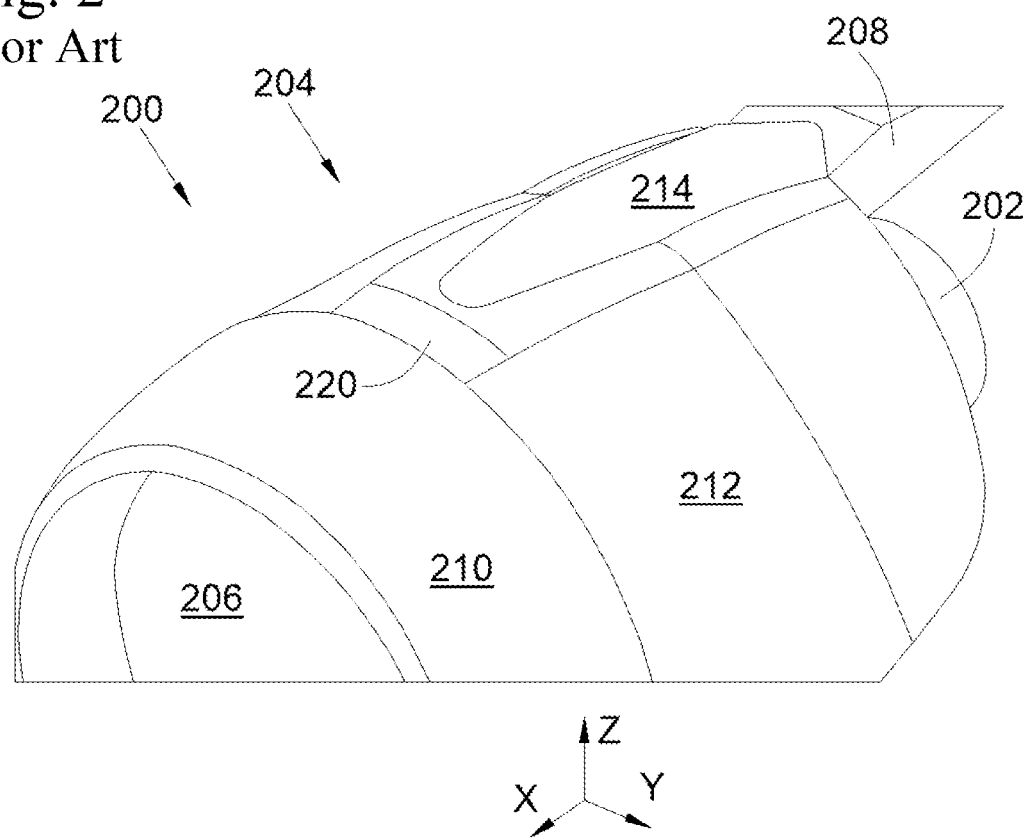
FIG. 2 is a perspective view of a nacelle.

FIG. 2 shows a perspective view of a propulsion system 200 which is similar to that of the prior art, the only difference being the seal system for the cap 220, which is not shown in this figure.

Thus, the propulsion system comprises the engine 202 and the nacelle 204, whose structure is attached to the pylon 208. In the exemplary embodiment of FIG. 2, the nacelle 204 comprises, attached to its structure, multiple cowlings (or fairings) in order to create an aerodynamic surface.

The nacelle 204 comprises a structure 50 to which there are attached: an air intake cowling 210 around its air intake 206, lateral cowlings 212 on either side of the nacelle 204, and an upper cowling 214 at the top of the nacelle 204.

The nacelle 204 comprises a cap 220 which is attached to the structure of the nacelle 204 by any suitable attachment means. The cap 220 is generally mounted on the structure in articulated fashion.

Figure 3:
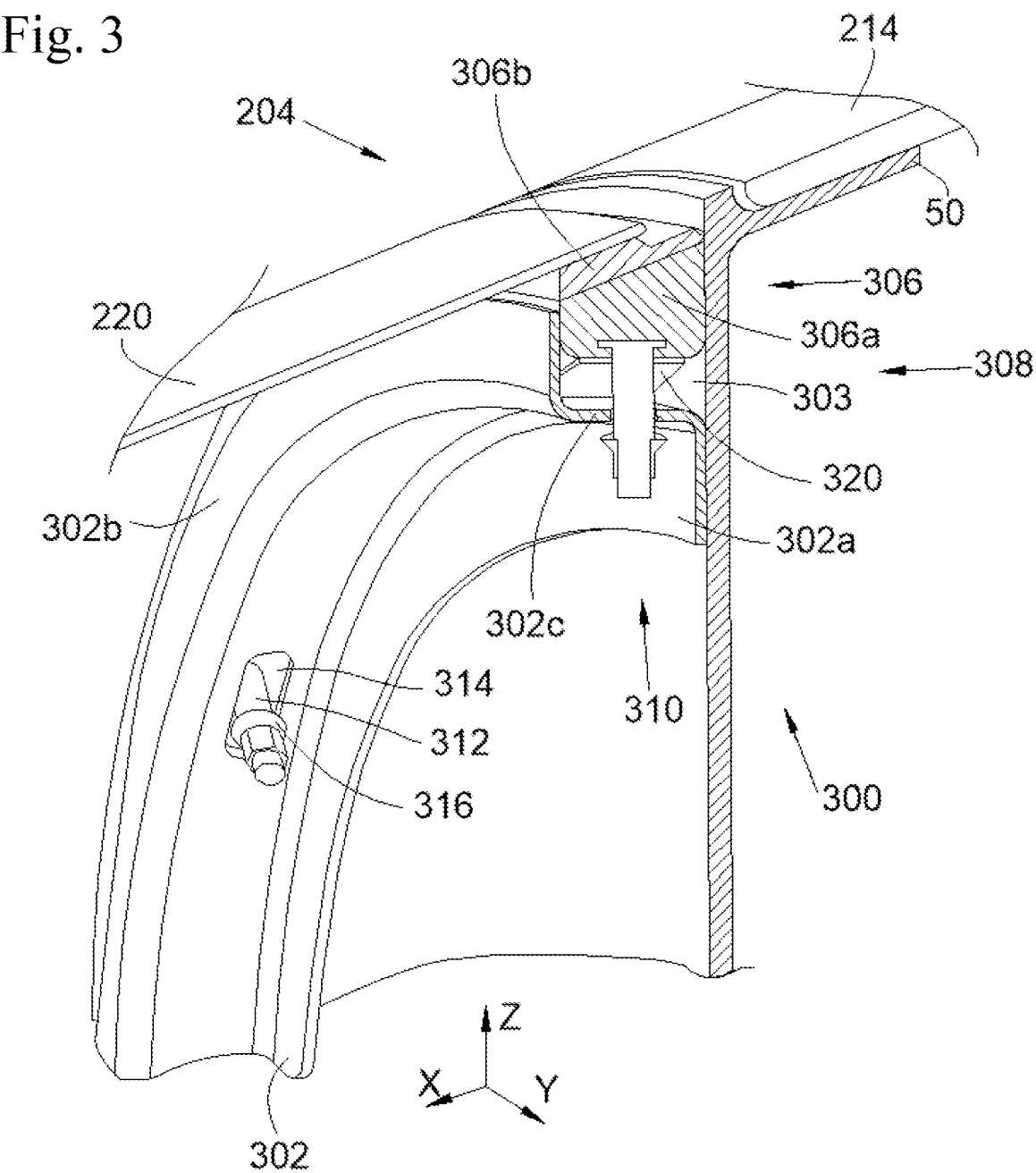
FIG. 3 is a perspective and section view, along a vertical plane XZ, of a nacelle according to the invention.
Figure 7:
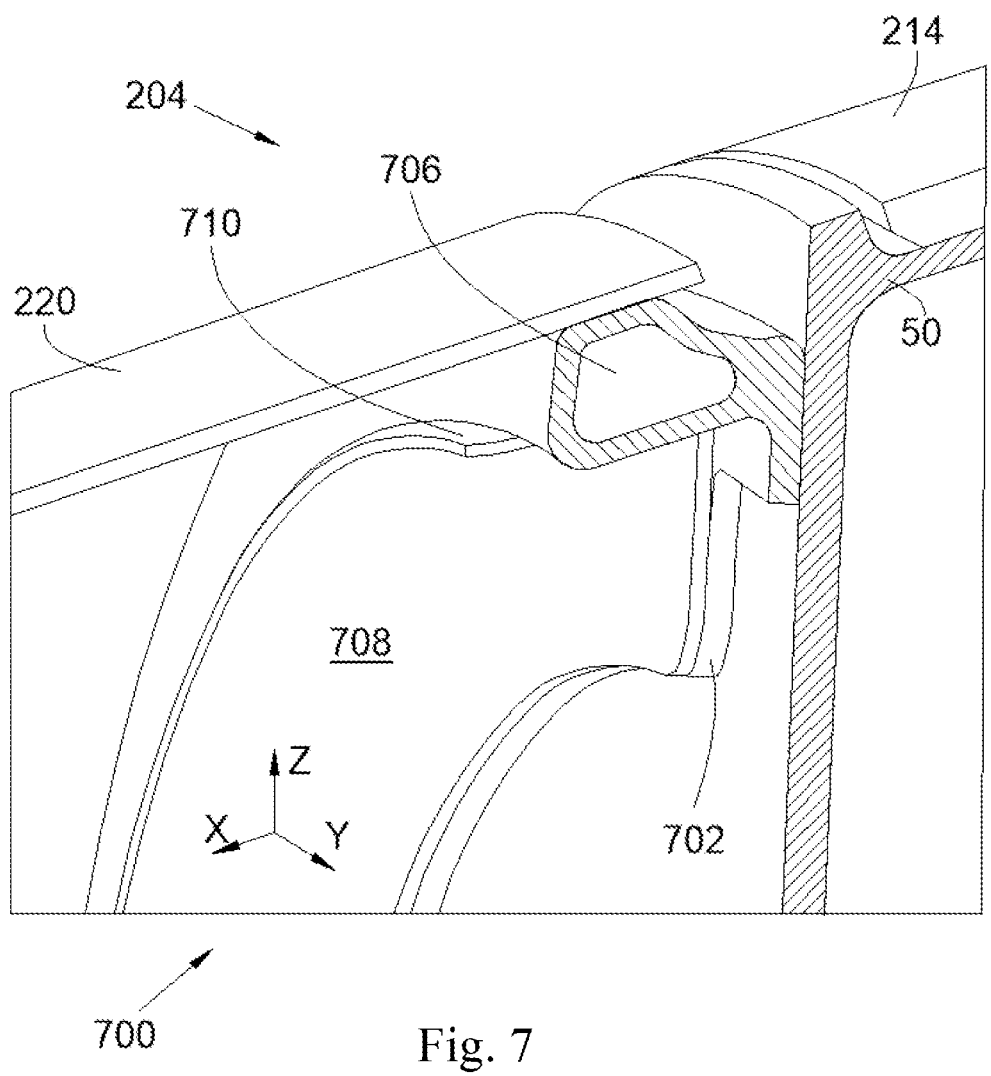
FIG. 7 is a perspective and section view, along a vertical plane XZ, of a prior art nacelle.

FIG. 3 is similar to FIG. 7, except that the seal system 300 according to the invention is different.

The seal system 300 comprises an arch 302 which is attached to the structure 50 of the nacelle 204 and forms a channel 303 which extends beneath the rear edge of the cap 220. The channel 303 has a bottom and extends angularly at least over the same angular extent as the cap 220 about the longitudinal axis X.

In the embodiment of the invention shown here, the channel 303 is created between the arch 302 and the structure 50 of the nacelle 204. Here, the arch 302 has a staircase-like cross section, of which: a first riser 302a is attached to the structure 50 using any appropriate means such as rivets, spot welding or the like; a second riser 302b extends parallel to the structure 50 and at a distance therefrom so as to delimit between them the thickness of the channel 303; and the step 302c extends between the two risers 302a-b and forms the bottom of the channel 303. In this embodiment, the second riser 302b forms the front wall of the channel 303 and the structure 50 forms the rear wall of the channel 303.

Of course, the channel 303 might be created by other means. For example, the arch having the staircase-like cross section might be replaced with an arch having a U-shaped cross section that directly forms the channel 303 and is attached by one of its flanks to the structure 50. In that embodiment, the flank attached to the structure 50 forms the rear wall of the channel 303 and the opposite flank forms the front wall of the channel 303.

The seal system 300 also comprises a seal 306, of the elastomer seal type, in the form of a solid block accommodated in the channel 303, that is to say, between the front wall and the rear wall, and extending angularly also over the same angular extent as the cap 220 about the longitudinal axis X.

Thus, the seal 306 is beneath the rear edge of the cap 220.

The seal system 300 also comprises a spring system 308 which is arranged to push the seal 306 against the cap 220, that is to say, to move it away from the bottom of the channel 303. Furthermore, the seal 306 is guided by the front and rear walls of the channel 303 under the thrust of the spring system 308.

The seal system 300 also comprises retaining means 310 which are provided in order to prevent the seal 306 from leaving the channel 303 under the action of the spring system 308.

With a seal system 300 of this kind, it is no longer necessary to oversize the bead of the seal system since it is replaced with a block. Here, the two functions of sealing and dimensional compensation are dissociated, with the seal 306 providing the sealing and the spring system 308 providing the dimensional compensation.

In the embodiment of the invention shown here, the retaining means 310 comprise a plurality of inserts 312, each one having a first end that is secured to the seal 306 and a second end that passes through the bottom of the channel 303, in this case the step 302c, through a hole 314 through the bottom and provided therefor.

The retaining means 310 also comprise a shoulder 316 which is secured to the second end of the insert 312 and whose dimensions prevent it from passing through the hole 314 in the bottom. Thus, when the spring system 308 pushes the seal 306 back, the shoulder 316 comes to bear against the bottom and prevents the seal 306 from moving.

In the embodiment of the invention shown here, the insert 312 is a threaded rod, one end of which is embedded in the seal 306, and the shoulder 316 is a nut screwed onto the threaded rod.

Figure 4:
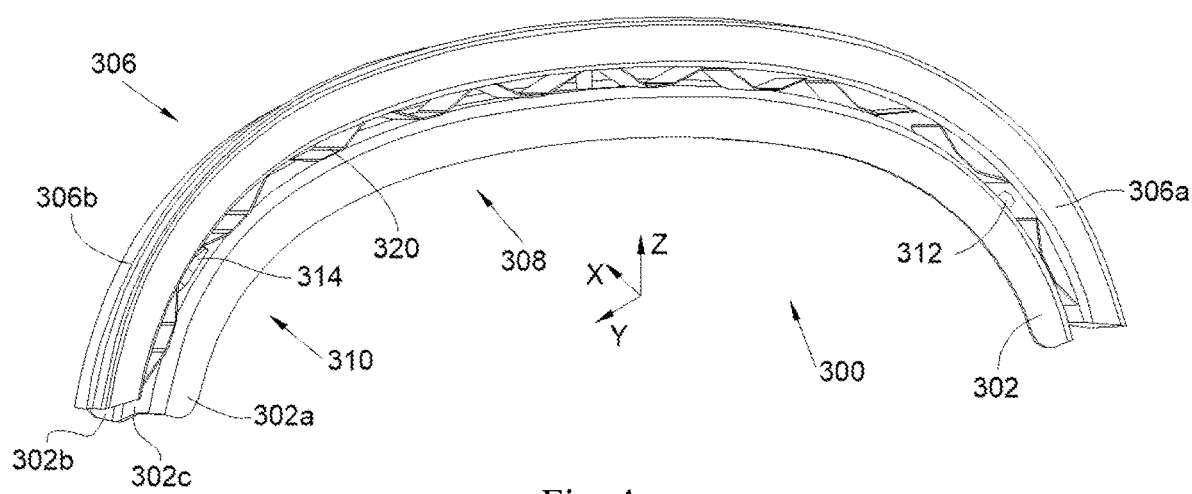
FIG. 4 is a rear view of the seal system according to the invention.

As shown in FIG. 4, in the embodiment of the invention presented here, there are three inserts 312: a central insert which is arranged at the level of the middle plane XZ, and two lateral inserts which are positioned symmetrically either side of the middle plane XZ. In order to immobilize along the longitudinal axis Y, the hole 314 corresponding to the central insert 312 is a circular bore that is dimensioned to provide a sliding fit between the insert 312 and the hole 314. The holes 314 of the lateral inserts 312 are oblong holes to allow the lateral inserts 312 to move parallel to the axis Z. Of course, the number of lateral inserts 312 may be different, depending on the dimensions of the arch 302.

As shown in FIG. 5 and FIG. 6, in the embodiment of the invention shown here, the spring system 310 comprises a plurality of spring blades 320. Each spring blade 320 is arranged between the seal 306 and the bottom of the channel 303. The spring blades 320 are distributed over the whole angular extent of the channel 303 in order to ensure a uniform thrust on the whole of the seal 306. Of course, the number and the dimensions of the spring blades 320 vary with the dimensions of the arch 302.

Each spring blade 320 is shaped in order to produce a thrust perpendicular to the bottom of the channel 303.

Here, each spring blade 320 comprises a central portion 522 attached to the bottom of the channel 303, for example by riveting or welding, and two wings 524 that are positioned on either side of the central portion 522 and are oriented towards the seal 306. Upon installation, the wings 524 are preloaded in order to push the seal 306 away even if there is no force on the seal 306.

The seal 306 comprises a core 306a and a strip 306b.

The core 306a is the lower part of the seal 306, that is to say, it is oriented towards the bottom of the channel 303, and is in contact with the spring system 310, and more particularly that against which the wings 524 are pressing, which is also the portion to which the inserts 312 are attached.

The strip 306b is a portion which is secured to the core 306a, for example by adhesive bonding, and presses against the cap 220, it is therefore that portion which is between the core 306a and the cap 220.

For better fire-resistance, the seal 306 is made of elastomer reinforced with glass fibers.

The strip 306b has a relatively low Shore hardness, and preferably of the order of a Shore 00 hardness of between 30 and 40, for a strip thickness of the order of 5 mm.

The core 306a is relatively flexible, which favors, among other things, with the spring system 308, a regular pressure of the strip 306b against the cap 220. The hardness of the core 306a is preferably a Shore 00 hardness of between 80 and 90, for a core thickness of the order of 15 mm.

In order to limit wearing by rubbing of the core 306a against the walls of the channel 303 and the spring blades 320, those walls of the core 306a that are in contact with the walls of the channel 303 and the spring system 310, that is to say, in this case the spring blades 320, are covered with a fabric, of the glass fiber fabric type.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for an aircraft, comprising a structure, a cap attached to the structure and a seal system comprising:
   an arch forming a channel which extends beneath a rear edge of the cap and which has a bottom, the arch being attached to the structure,
   a seal formed as a solid block accommodated in the channel and positioned beneath the rear edge of the cap,
   a spring system arranged to move the seal away from the bottom, and
   retaining means configured to prevent the seal from leaving the channel under an action of the spring system.

2. The nacelle according to claim 1, wherein the retaining means comprise a plurality of inserts, each insert having a first end that is secured to the seal and a second end that passes through the bottom of the channel through a hole through said bottom and provided therefor, and a shoulder which is secured to the second end of the insert and whose dimensions prevent the insert from passing through the hole in the bottom.

3. The nacelle according to claim 2,
   wherein a central insert of the plurality of inserts is arranged at a level of a middle plane, and
   wherein the hole corresponding to the central insert is a circular bore that provides a sliding fit between the central insert and the hole.

4. The nacelle according to claim 3, wherein two lateral inserts of the plurality of inserts are positioned symmetrically on either side of the middle plane, wherein the holes corresponding to the lateral inserts are oblong holes.

5. The nacelle according to claim 1,
   wherein the spring system comprises a plurality of spring blades,
   wherein each spring blade is arranged between the seal and the bottom of the channel, and
   wherein each spring blade comprises a central portion attached to the bottom of the channel and two wings that are positioned on either side of the central portion and are oriented towards the seal.

6. The nacelle according to claim 1, wherein the seal comprises a core which is oriented towards the bottom of the channel, and a strip which is secured to the core and is configured to press against the cap.

7. The nacelle according to claim 6, wherein the strip has a Shore 00 hardness of between 30 and 40, and the core has a Shore 00 hardness of between 80 and 90.

8. The nacelle according to claim 6, wherein walls of the core that are in contact with walls of the channel and the spring system are covered with a fabric.

9. The nacelle according to claim 1, wherein the arch has a staircase-like cross section, of which:
   a first riser is attached to the structure;
   a second riser extends parallel to the structure and at a distance therefrom so as to delimit between them a thickness of the channel; and
   a step extends between the two risers and forms the bottom of the channel.

10. The nacelle according to claim 1, wherein the arch has a U-shaped cross section that forms the channel and is attached by one of its flanks to the structure.

11. An aircraft comprising a mounting pylon and a nacelle according to claim 1, mounted on the mounting pylon.

* * * * *